(12) United States Patent
Wu et al.

(10) Patent No.: US 12,042,699 B2
(45) Date of Patent: Jul. 23, 2024

(54) POLE-GRIPPING MECHANISM AND MANNED POLE- CLIMBING WORK PLATFORM

(71) Applicants: State Grid Anhui Electric Power Co., Ltd. Huainan Power Supply Company, Anhui (CN); Electric Power Research Institute, Anhui Electric Power Company of State Grid, Anhui (CN); Huainan Ruixue Intelligent Technology Co., Ltd., Anhui (CN); State Grid Corporation of China, Beijing (CN)

(72) Inventors: Shaolei Wu, Anhui (CN); Qi Wang, Anhui (CN); Xuming Tang, Anhui (CN); Xiaofeng Shan, Anhui (CN); Shan Gao, Anhui (CN); Xianguo Han, Anhui (CN); Mengdi Shi, Anhui (CN); Yu Feng, Anhui (CN); Yang Liu, Anhui (CN); Xiang Guo, Anhui (CN); Wudong Zhen, Anhui (CN); Wancheng Wang, Anhui (CN); Mingshuai Zhang, Anhui (CN); Qiangqiang Hou, Anhui (CN)

(73) Assignees: State Grid Anhui Electric Power Co., Ltd. Huainan Power Supply Company, Anhui (CN); Electric Power Research Institute, Anhui Electric Power Company of State Grid, Anhui (CN); Huainan Ruixue Intelligent Technology Co., Ltd., Anhui (CN); State Grid Corporation of China, Beijing (CN)

( * ) Notice: Subject to any disclaimer, the term of this patent is extended or adjusted under 35 U.S.C. 154(b) by 320 days.

(21) Appl. No.: 17/040,291

(22) PCT Filed: Jun. 15, 2020

(86) PCT No.: PCT/CN2020/096041
§ 371 (c)(1),
(2) Date: Sep. 22, 2020

(87) PCT Pub. No.: WO2021/022906
PCT Pub. Date: Feb. 11, 2021

(65) Prior Publication Data
US 2023/0001269 A1    Jan. 5, 2023

(30) Foreign Application Priority Data

Aug. 2, 2019  (CN) .......................... 201910712834.8
Aug. 2, 2019  (CN) .......................... 201910716283.2

(51) Int. Cl.
A63B 27/00            (2006.01)

(52) U.S. Cl.
CPC .................................... *A63B 27/00* (2013.01)

(58) Field of Classification Search
CPC ............ A63B 27/00; B66C 1/42; B25J 18/00; B62D 57/024; E04G 21/3247
See application file for complete search history.

(56) References Cited

U.S. PATENT DOCUMENTS

2018/0009102 A1   1/2018   Priest et al.

FOREIGN PATENT DOCUMENTS

CN   101480972 A      7/2009
CN   204264311 U  *  4/2015   ........... B62D 57/024
(Continued)

OTHER PUBLICATIONS

English translation of Han CN 109364439 (Year: 2019).*
(Continued)

*Primary Examiner* — Brian D Mattei
*Assistant Examiner* — Jacob G Sweeney
(74) *Attorney, Agent, or Firm* — Joseph M. Maraia; ArentFox Schiff LLP

(57) ABSTRACT

Provided are a manned pole-climbing work platform and a pole-gripping mechanism thereof. The pole-gripping mechanism includes an arm and a distal pole-gripping mechanical hand. The distal pole-gripping mechanical hand includes a front jaw, a rear jaw, a forward-threaded rod, a reverse- (Continued)

threaded rod and a preloader. The front jaw and the rear jaw are articulated with the arm through pivots. The preloader is configured to drive the forward-threaded rod and the reverse-threaded rod to rotate synchronously. The forward-threaded rod and the front jaw are articulated with each other through a front thrust-nut composite pivot. The reverse-threaded rod and the rear jaw are articulated with each other through a rear thrust-nut composite pivot. The front jaw and the rear jaw are openable or closeable relative to each other.

18 Claims, 9 Drawing Sheets

(56) References Cited

FOREIGN PATENT DOCUMENTS

| CN | 204264311 | U |   | 4/2015  |             |
|----|-----------|---|---|---------|-------------|
| CN | 105641880 | A |   | 6/2016  |             |
| CN | 106112993 | A | * | 11/2016 | B25J 9/00   |
| CN | 106112993 | A |   | 11/2016 |             |
| CN | 206374856 | U |   | 8/2017  |             |
| CN | 107512321 | A | * | 12/2017 | B62D 57/024 |
| CN | 208165133 | U |   | 11/2018 |             |
| CN | 109178132 | A |   | 1/2019  |             |
| CN | 109364439 | A | * | 2/2019  | A63B 27/04  |
| CN | 109364439 | A |   | 2/2019  |             |
| CN | 109572849 | A |   | 4/2019  |             |
| CN | 110877646 | A |   | 3/2020  |             |
| CN | 211252833 | U |   | 8/2020  |             |
| JP | H0557638  | A |   | 3/1993  |             |
| WO | 92/04269  |   |   | 3/1992  |             |

OTHER PUBLICATIONS

English translation of Mo CN 106112993A (Year: 2016).*
International Search Report and Written Opinion from related PCT Application No. PCT/CN2020/096041, dated Sep. 18, 2020.

* cited by examiner

POLE-GRIPPING MECHANISM AND MANNED POLE-CLIMBING WORK PLATFORM

CROSS-REFERENCE TO RELATED APPLICATION(s)

This is a national stage application filed under 37 U.S.C. 371 based on International Patent Application No. PCT/CN2020/096041, filed Jun. 15, 2020, which claims priority to Chinese Patent Applications No. 201910712834.8 and No. 201910716283.2 both filed Aug. 2, 2019, the disclosures of which are incorporated herein by reference in their entireties.

TECHNICAL FIELD

The present application relates to a work platform for climbing up and down a pole or a columnar object and, in particular, to a manned pole-climbing work platform and a pole-gripping mechanism for the manned pole-climbing work platform in place of a commonly used pole-climbing tool, "pole climbers".

BACKGROUND

In the power industry, it's an inevitable step to climb a pole or a tower during a work to maintain a power line. A standardized operation during climbing is directly related to the personal safety of an operator and the operation safety of an electric power system. Injury and death accidents frequently happen to pole-climbing operators especially in recent years.

In the related art, pole climbers are the most commonly used pole-climbing tool.

1. A pole-climbing person must be professionally trained before using pole climbers formally. Since the operator has to keep balance during force conversion, the pole-climbing person climbs completely based on the balance of force to change the feet in an up-down direction.

2. Whether pole climbers can fasten the pole depends completely on the operator and is determined completely by the personal experience of the operator, so the security and the reliability of the operation are low.

3. Climbing with pole climbers needs a high labor intensity, leads to a short standing time, wastes a lot of energy and tires the operator easily. Therefore, the operator feels heavy and panic during the operation, so the operator is easy to lose his concentration during the operation and causes an accident.

In the related art, various pole-climbing devices in place of humans climbing poles to perform dangerous work are provided. The pole-climbing devices are divided into inchworm-type pole-climbing devices and roller-type pole-climbing devices according to their ways of climbing. The main feature of a roller-type pole-climbing device is to positively impose a positive pressure on a columnar pole through a roller to generate a friction to overcome the gravity. The main feature of an inchworm-type pole-climbing device is that the upper end and the lower end of the device grip and release a pole by turns, and climbing is implemented by movement or rotation of a connecting portion.

For complex working conditions, manual pole climbing is still needed. Compared with non-manual climbing, in the manual climbing, a large load needs to be borne and the requirements for safety and reliability are high.

SUMMARY

The present disclosure provides a pole-gripping mechanism, for a manned pole-climbing work platform. The pole-gripping mechanism contributes to replace a commonly used pole-climbing tool, the pole climbers, and provides enough pole-gripping force.

The present disclosure further provides a manned pole-climbing work platform. The manned pole-climbing work platform can replace a commonly used pole-climbing tool, the pole climbers, and provide enough pole-gripping force.

In one aspect, the present application provides the pole-gripping mechanism. The pole-gripping mechanism is applicable to the manned pole-climbing work platform and includes an arm and a distal pole-gripping mechanical hand. The distal pole-gripping mechanical hand includes a front jaw, a rear jaw, a front pivot, a rear pivot and a pole-gripping driver assembly.

The pole-gripping driver assembly includes a front thrust-nut composite pivot, a rear thrust-nut composite pivot, a forward-threaded rod, a reverse-threaded rod and a preloader.

The front jaw and the arm are articulated with each other through the front pivot, and the rear jaw and the arm are articulated with each other through the rear pivot.

The preloader is configured to drive the forward-threaded rod and the reverse-threaded rod to rotate synchronously, the forward-threaded rod and the front jaw are articulated with each other through the front thrust-nut composite pivot, and the reverse-threaded rod and the rear jaw are articulated with each other through the rear thrust-nut composite pivot.

The front jaw and the rear jaw are openable or closeable relative to each other to release or grip a pole.

In another aspect, the present disclosure provides the manned pole-climbing work platform. The manned pole-climbing work platform includes a main unit, a left body, a right body, a lifting actuator, and pole-gripping mechanisms located on the left body and the right body.

The lifting actuator includes a double sprocket driven by the main unit, an up-holding chain, a down-holding chain, a left slide rail securely connected to the left body, a right slide rail securely connected to the right body, and slide carriages cooperating with the left slide rail and the right slide rail respectively.

The up-holding chain and the down-holding chain are engaged with the double sprocket, two ends of the up-holding chain are connected to an upper end of the left body and an upper end of the right body respectively, two ends of the down-holding chain are connected to a lower end of the left body and a lower end of the right body respectively, the double sprocket is freely rotatably supported by the slide carriages, and the main unit drives the double sprocket to rotate.

One of the left body or the right body is configured to grip the pole through the pole-gripping mechanisms, the other of the left body or the right body is driven by the lifting actuator to move upwardly, and the left body and the right body move by turns, so that the main unit climbs upwardly.

Each of the pole-gripping mechanisms is the pole-gripping mechanism above.

BRIEF DESCRIPTION OF DRAWINGS

FIG. 7A illustrates a state when a right body is at a lower position, FIG. 7B illustrates a state when the right body is lifted to flush with a left body, FIG. 7C illustrates a state when the right body is lifted to be above the left body;

FIG. 9A illustrates a climbing state when the left body is at a lower position, FIG. 9B illustrates a climbing state when the right body is at a lower position, FIG. 9C illustrates a state when the left body and the right body embrace a pole at the same time;

DETAILED DESCRIPTION

It's to be noted that, embodiments and features of the embodiments according to the present disclosure may combine together in a case without confliction. The present disclosure will be detailly described below in conjunction with the drawings and embodiments.

FIGS. 1 to 12 illustrate some embodiments according to the present disclosure.

Figure 1:
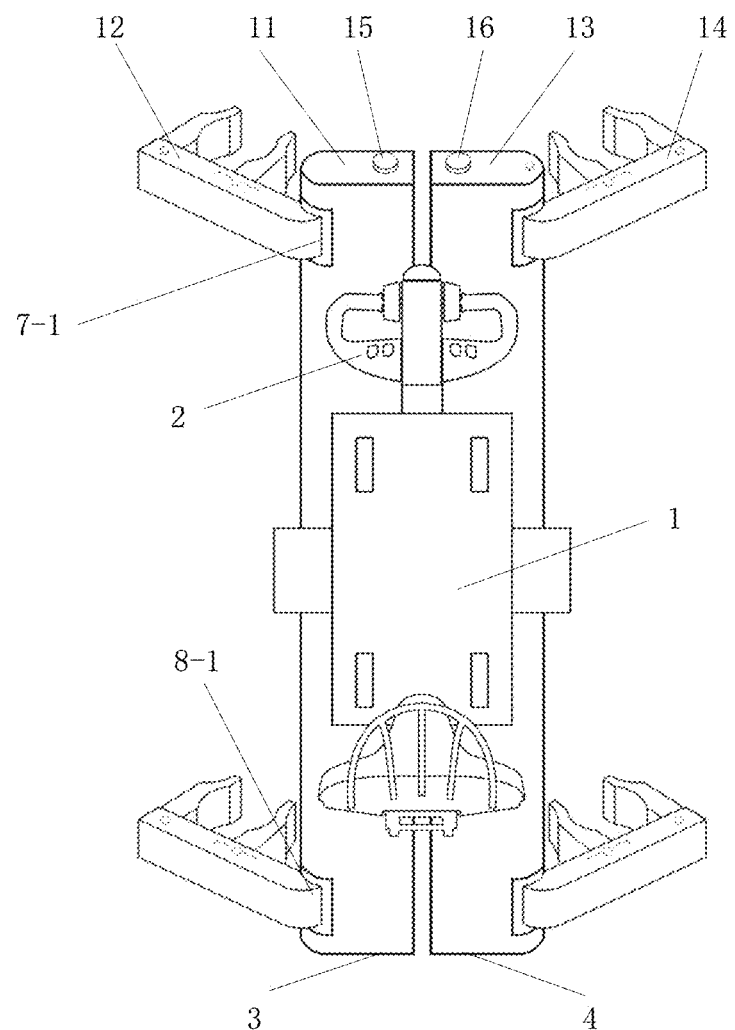
FIG. 1 is a first schematic view illustrating the structure of a manned pole-climbing work platform according to the present disclosure.
Figure 2:
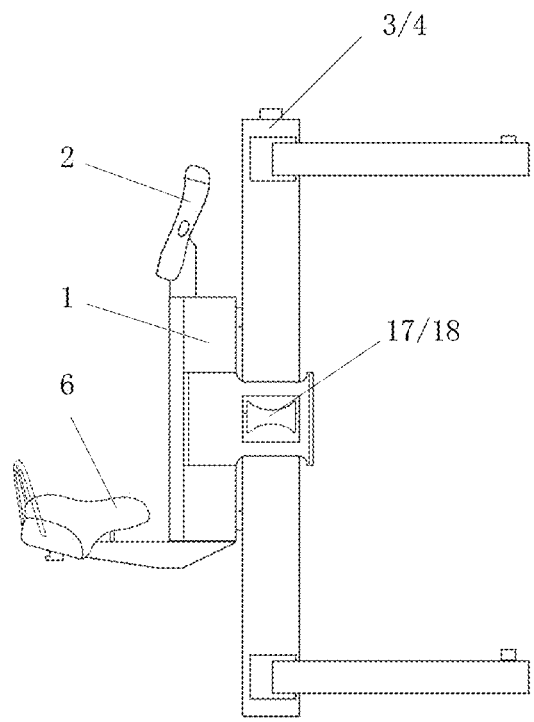
FIG. 2 is a second schematic view illustrating the structure of the manned pole-climbing work platform according to the present disclosure.

Referring to FIG. 1 and FIG. 2, a manned pole-climbing work platform of the present disclosure includes a main unit 1, a control handle 2, a left body 3, a right body 4, a seat 6, four limbs (which includes a left upper pole-gripping mechanism 7, a left lower pole-gripping mechanism 8, a right upper pole-gripping mechanism 9 and a right lower pole-gripping mechanism 10), a left safety thrust roller 17 and a right safety thrust roller 18.

The left body 3 and the right body 4 are disposed symmetrically in a left right direction and can be driven by a lifting actuator to move in the vertical direction by turns.

Each of the pole-gripping mechanisms includes an arm and a distal pole-gripping mechanical hand. The distal pole-gripping mechanical hand is used for tightly gripping a pole (such as an electric pole) within a certain range of diameters. In the case of a pole with a special measurement, a corresponding end gripping tool may be replaced. The arm is driven by a pole-embracing mechanism to rotate by a set degree, such as 100°, about a longitudinal axis of a body (such as the left body 3 and the right body 4).

A lifting power assembly, a battery pack, a control unit (controller) and a drive unit are disposed inside the main unit 1.

The control handle 2 and the seat 6 are securely connected to the main unit 1.

The left safety thrust roller 17 rolls along the left side wall of the left body 3, and the right safety thrust roller 18 rolls along the right side wall of the right body 4.

Ultrasonic-wave-transmission-and-reception sensors 11, 12, 13 and 14, and high voltage sensors 15 and 16 are disposed on the left body 3, the right body 4, the left upper pole-gripping mechanism 7 and the right upper pole-gripping mechanism 9.

The control handle can be held by an operator and can be manually operated to control climbing. The control handle has an emergency stop button and other functional buttons. An automatic program can be paused and stopped at any time. An execution of the automatic program can be manually intervened when avoiding and negotiating obstacles are needed. A switch can implement functional conversions between "manual" and "automatic".

Figure 3:
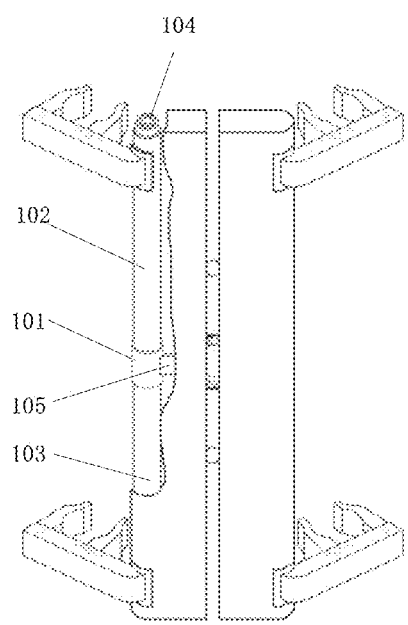
FIG. 3 is a first schematic view illustrating the structure of a pole-embracing actuator of the manned pole-climbing work platform according to the present disclosure.
Figure 4A:
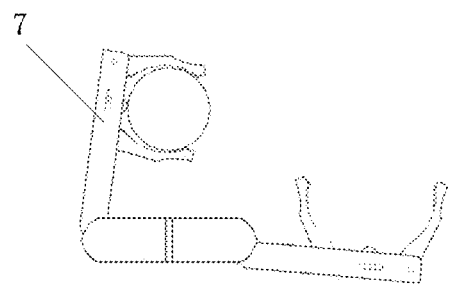
FIGS. 4A to 4C are second schematic views of the pole-embracing actuator of the manned pole-climbing work platform according to the present disclosure.
Figure 4B:
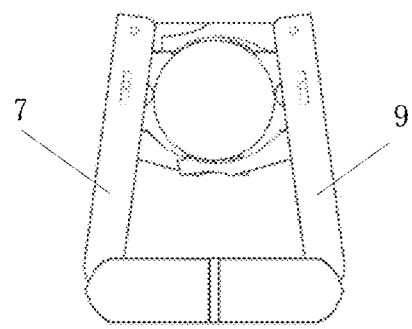
Figure 4C:
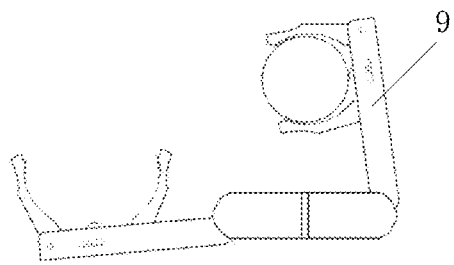
Figure 5:
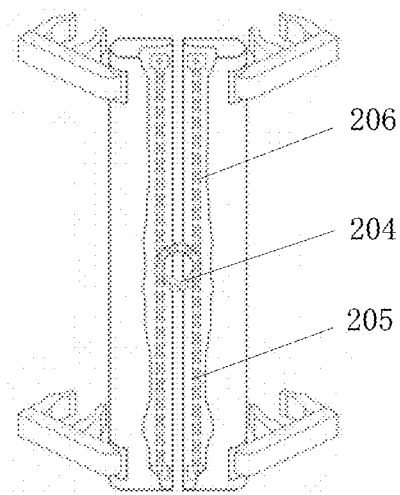
FIG. 5 is a first schematic view illustrating the internal structure of the pole-embracing actuator of the manned pole-climbing work platform according to the present disclosure.

Referring to FIGS. 3 to 4C, the pole-embracing mechanism on the left body 3 includes a hollow-shaft geared motor 101, an upper transmission shaft 102, a lower transmission shaft 103, bearings 104 and an anti-torsion beam 105.

An upper transmission shaft 102 and a lower transmission shaft 103 are rigidly connected to the hollow-shaft geared motor 101 and are secured to bearings 104 located at the upper tip and the lower tip inside the left side of the left body 3. The anti-torsion beam is used for securing the motor 101.

The hollow-shaft geared motor 101 is a combination of a servo motor and a hollow-structured reducer RV-20C-121, where a cable can cross through the hollow structure. The pole-embracing mechanism moves by rotating horizontally. The pole-embracing mechanism applies work only against little frictions caused by rotation of bearings and other comprehensive resistance, but not against the gravity of the earth, so the power of the servo motor may be very little. The power of the servo motor is chosen to be 90 W according to experiments.

The arm 7-1 of the left upper pole-embracing mechanism 7 and the arm 8-1 of the left lower pole-embracing mechanism 8 are rigidly connected to the upper transmission shaft 102 inside the left body 4 and the lower transmission shaft 103 inside the left body 4 respectively. The arm 7-1 of the left upper pole-embracing mechanism 7 and the arm 8-1 of the left lower pole-embracing mechanism 8 can rotate about the longitudinal axis of an outer side of the left body 4 by 100°. The hollow-shaft geared motor 101 drives the left upper pole-embracing mechanism 7 and the left lower pole-embracing mechanism 8 to embrace the pole and to open. The right upper pole-embracing mechanism and the right lower pole-embracing mechanism are symmetrical to the left upper pole-embracing mechanism and the left lower pole-embracing mechanism.

FIGS. 4A to 4C sequentially illustrates a half-embracing state of the left upper pole-gripping mechanism 7, a fully-embracing state of the left upper pole-gripping mechanism 7 and a half-embracing state of the right upper pole-gripping mechanism 9.

Referring to FIGS. 5 to 8, the lifting actuator includes a servo motor 201, an NMRV reducer 202, a transfer shaft 203, a double sprocket 204, a down-holding chain 205 and an up-holding chain 206.

The lifting actuator further includes a lower-end transmission-chain fixing seat 231 of the left body, a lower-end transmission-chain fixing seat 232 of the right body, a front slide rail 241 of the left body, a rear slide rail 251 of the left body, a front slide rail 261 of the right body, a rear slide rail 271 of the right body, slide carriages (which include a front slide block 242 of the left body, a rear slide block 252 of the left body, a front slide block 262 of the right body and a rear slide block 272 of the right body), a shell 208 of the left body, a shell 209 of the right body, a main beam 210 of the main unit, a power unit 211 (which includes the servo motor 201 and the NMRV reducer 202), a right safety thrust roller 18 and a shell 213 of the main unit.

In some embodiments, the front slide rail 241 of the left body and the rear slide rail 251 of the left body are securely connected to the left body and extend over the whole height of the left body. The front slide rail 261 of the right body and the rear slide rail 271 of the right body are secured to the right body and extend over the whole height of the right body. The front slide block 242 of the left body cooperates with the front slide rail 241 of the left body by inserting, and the rear slide block 252 of the left body is cooperating with the rear slide rail 251 of the left body by inserting. The front slide block 262 of the right body is cooperating with the front slide rail 261 of the right body by inserting, and the rear slide block 272 of the right body is cooperating with the rear slide rail 271 of the right body by inserting.

In some embodiments, the front slide block 242 of the left body is securely connected to the front slide block 262 of the right body, and the rear slide block 252 of the left body is securely connected to the rear slide block 272 of the right body. The front slide block 242 of the left body, the front slide block 262 of the right body, the rear slide block 252 of the left body and the rear slide block 272 of the right body are used for supporting two ends of the double sprocket. The upper portion and the lower portion of each of the front slide block 242 of the left body, the front slide block 262 of the right body, the rear slide block 252 of the left body and the rear slide block 272 of the right body are securely connected to the main unit, and the height of each of the front slide block 242 of the left body, the front slide block 262 of the right body, the rear slide block 252 of the left body and the rear slide block 272 of the right body is one-half to one-third of the whole height of the left body.

In some embodiments, one of the two ends of the up-holding chain 206 is connected to an upper transmission-chain fixing seat on the left body, and the other of the two ends of the up-holding chain 206 is connected to an upper transmission-chain fixing seat of the right body. One of the two ends of the down-holding chain 205 is connected to a lower transmission-chain fixing seat of the left body, and the other of the two ends of the down-holding chain 205 is connected to a lower transmission-chain fixing seat of the right body.

Figure 6:
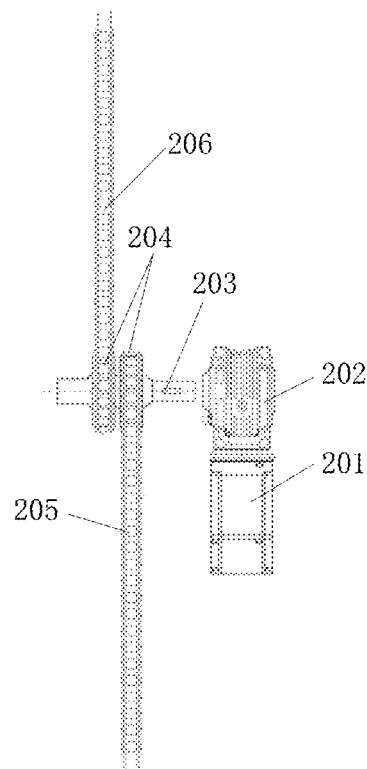
FIG. 6 is a second schematic view illustrating the internal structure of the pole-embracing actuator of the manned pole-climbing work platform according to the present disclosure.
Figures 7A, 7B, 7C:
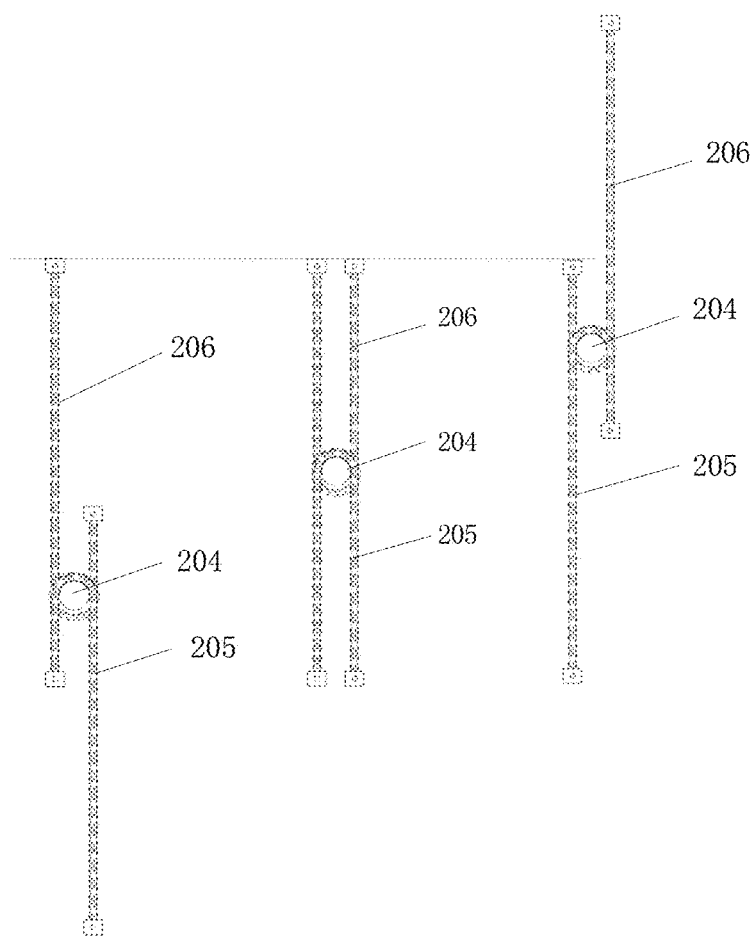
FIGS. 7A to 7C illustrate a climbing process of the pole-embracing actuator of the manned pole-climbing work platform according to the present disclosure.
Figure 8:
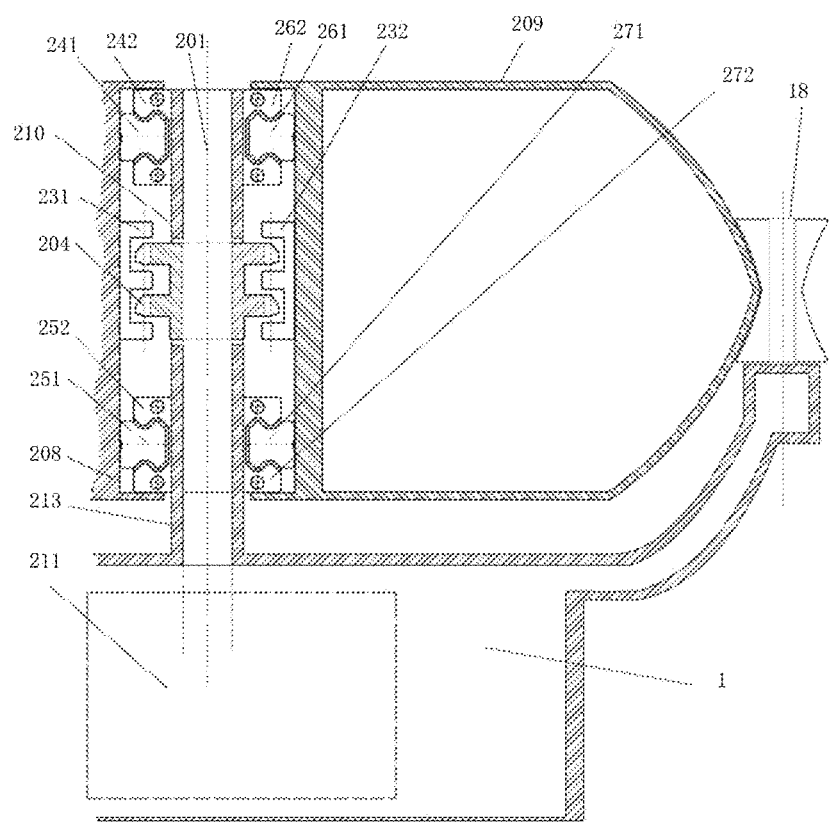
FIG. 8 is cross-sectional view of the pole-embracing actuator of the manned pole-climbing work platform according to the present disclosure.

In some embodiments, referring to FIG. 6, the double sprocket 204 includes two sprockets, where the two sprockets are coaxially disposed and the two sprockets may be secured to each other to implement a synchronous rotation. The down-holding chain 205 is engaged with one of the two sprockets, and the up-holding chain 206 is engaged with the other of the two sprockets, so that the double sprocket 204 can drive the down-holding chain 205 and the up-holding chain 206 to move synchronously when the double sprocket 204 is driven by the NMRV reducer 202 to rotate.

In the present disclosure, the left body and the right body are driven by the lifting actuator to move by turns in an up-down direction, and interlock with each other. A handover time during an interlock is over 0.2 second, namely the right body is lifted 0.2 second after the left body is lifted, so that the safety and the reliability during the movements by turns are ensured. The safety thrust rollers 17 and 18 disposed on two sides of the main unit are used for surrounding the left body and the right body to ensure the safety during the movements.

In some embodiments, a velocity of movements of the bodies is 0.6 meter per second. Since an output gear of a power assembly has the structure of a movable pulley, a lifting speed of the main unit and the seat is 0.3 meter per second.

Figure 9A:
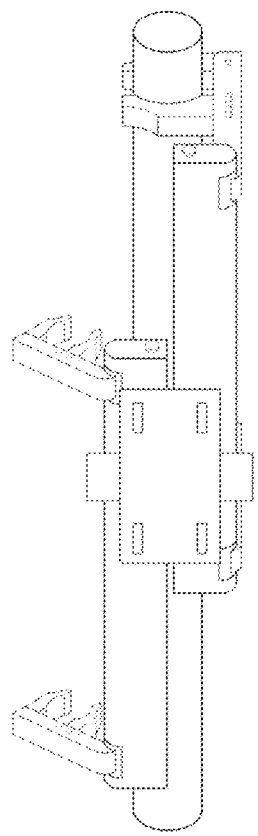
FIGS. 9A to 9C illustrate a climbing process of the manned pole-climbing work platform according to the present disclosure.
Figure 9B:
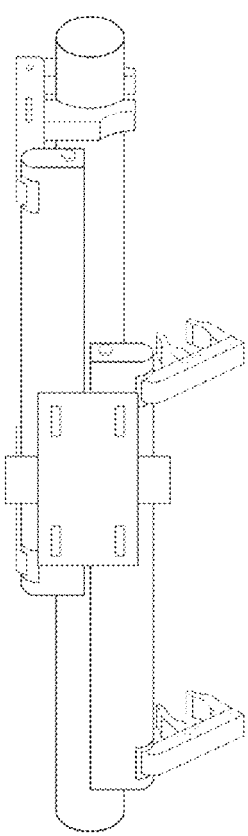
Figure 9C:
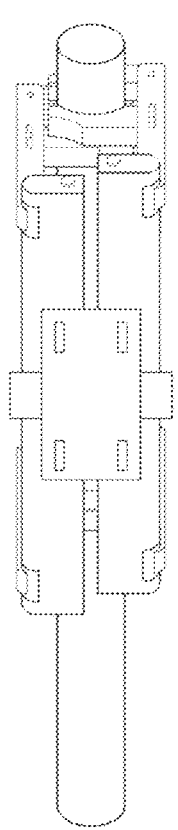

FIG. 9A illustrates a climbing state when the left body is at a lower position, FIG. 9B illustrates a climbing state when the right body is at a lower position, and FIG. 9C illustrates a state when the left body and the right body embrace the pole at the same time. When the four limbs grip the pole at the same time, the left portion and the right portion of the four limbs can be staggered in the up-down direction, but not flush with each other.

A climbing process of the manned pole-climbing work platform is as follows:

1. The left body embraces the pole: two of the pole-gripping mechanisms rotate about the longitudinal axis of the left body synchronously in the direction close to the pole; a moment when the action of pole embracing is completed is a moment when the action of pole gripping is started.

2. The left body grips the pole: after two pole-gripping mechanisms of the left body embraces the pole in place, the distal pole-gripping mechanical hand of each of the two pole-gripping mechanisms of the left body grips the pole and maintains the gesture.

3. The right body is lifted: 0.2 second after the action of pole gripping is completed, the right body is lifted to a maximum stroke and stops, so that a lifting is completed, and then the right body starts to embrace the pole.

4. The right body embraces the pole: two of the pole-gripping mechanisms rotate about the longitudinal axis of the right body synchronously in the direction close to the pole; a moment when the action of pole embracing is completed is a moment when the action of pole gripping is started.

5. The right body grips the pole: after two pole-gripping mechanisms of the left body embraces the pole in place, the distal pole-gripping mechanical hand of each of the two pole-gripping mechanisms of the right body grips the pole and maintains the gesture;

6. The left body releases the pole: after 0.2 second, the left body 4 starts to release the pole; escaping from the pole is an inverse movement of embracing the pole and pole-gripping the pole, which is the distal pole-gripping mechanical hand changes from a gripping state to an opening state, the arm rotates in the direction away from the pole to move to return.

7. The left body is lifted: the left body is lifted to the maximum stroke and stops, so that a lifting is completed; an automatic climbing is implemented such that the above steps 1 to 6 are executed repeatedly in circles until a stop button is pressed. When the stop button is pressed, a system will stop after one of the above steps is completed. However, the system can be stopped immediately by pressing an emergency stop button.

Figure 10:
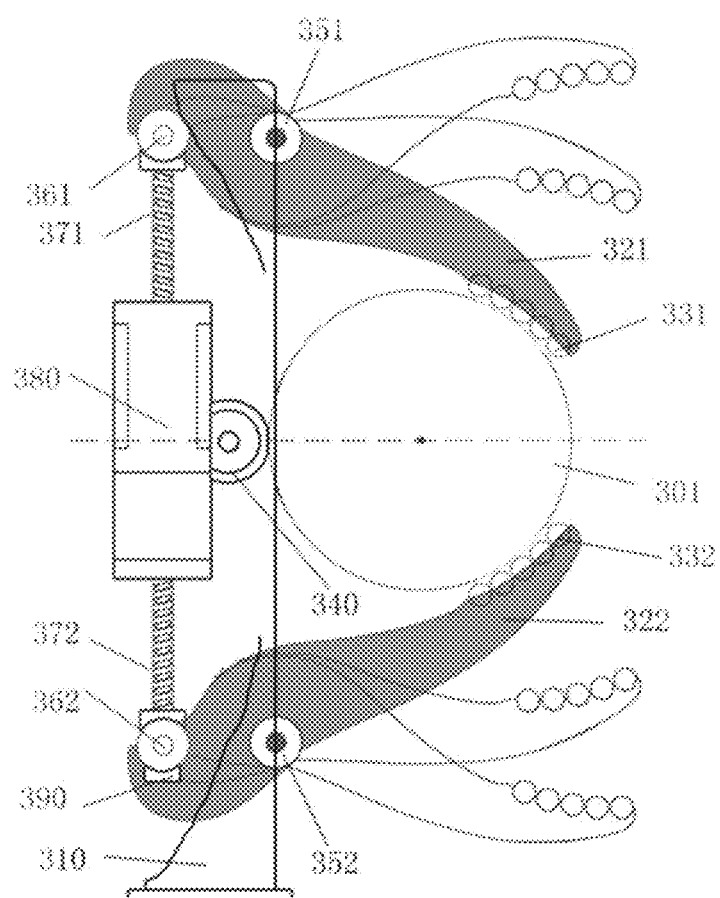
FIG. 10 is a schematic view illustrating the structure of a pole-gripping mechanism of the manned pole-climbing work platform according to the present disclosure.
Figure 11:
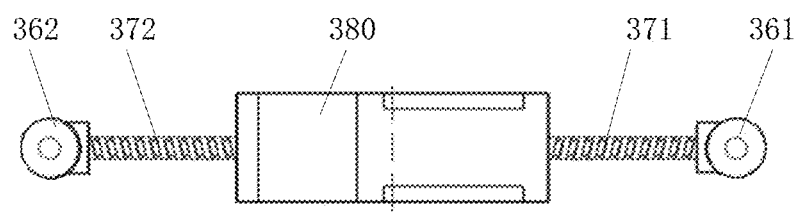
FIG. 11 is a schematic view illustrating a driving portion of the pole-gripping mechanism of the manned pole-climbing work platform according to the present disclosure.
Figure 12:
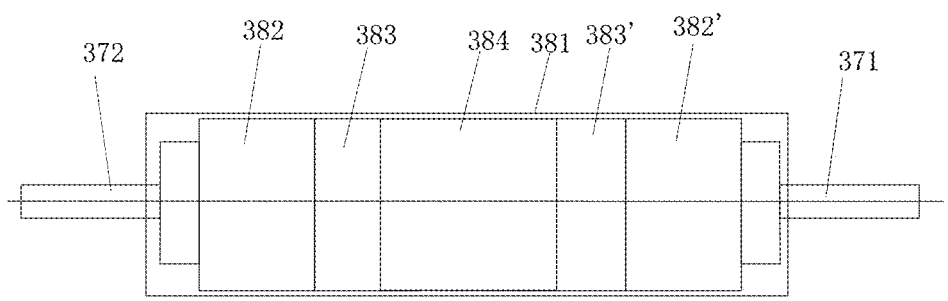
FIG. 12 is a schematic view illustrating the structure of a kinetic-energy-impact-type thread-preloader of the pole-gripping mechanism of the manned pole-climbing work platform according to the present disclosure.

Following is a detailed description of the structure of the pole-gripping mechanism of a manned pole-climbing device according to the present disclosure in conjunction with FIGS. 10 to 12.

Referring to FIG. 10, the pole-gripping mechanism includes a high-strength-steel shell 310, a front jaw 321, a rear jaw 322, a front driven rotation pulley 331, a rear driven rotation pulley 332, a driving rotation pulley 340, a front pivot 351, a rear pivot 352, a front thrust-nut composite pivot 361, a rear thrust-nut composite pivot 362, a forward-threaded rod 371, a reverse-threaded rod 372, a preloader (such as, a kinetic-energy-impact-type thread-preloader (or assembly) 380), a pressure sensor 390 and a pole-simulating sectional profile 301.

In some embodiments, referring to FIG. 10, the forward-threaded rod 371 and the reverse-threaded rod 372 are threaded in opposite directions. The thread on the forward-threaded rod 371 is left-handed, and the thread on the reverse-threaded rod 372 is right-handed, so that the front thrust-nut composite pivot 361 and the rear thrust-nut composite pivot 362 move in opposite directions when the forward-threaded rod 371 and the reverse-threaded rod 372 rotate synchronously.

In some embodiments, each of the front thrust-nut composite pivot 361 and the rear thrust-nut composite pivot 362 is constituted by a thrust nut and a hinge portion, where the thrust nut and a screw constitutes a screw-nut pair, and the hinge portion is articulated with a tail of a jaw.

In some embodiments, the front jaw 321 moves like a lever, whose fulcrum is the front pivot 351. A forward thrust acted by a front thrust nut 361 and a counter acting force acted by the pole at the front driven rotation pulley 331 balance the front jaw 321 like a lever. The rear jaw 322 also moves like a lever. A downward thrust acted by a rear thrust nut 362 and a counter acting force acted by the pole at the rear driven rotation pulley 332 balance the rear jaw 322 like a lever. The front thrust nut and the rear thrust nut jointly push the pole to the driving rotation pulley 340, and the driving rotation pulley 340 acts an elastic force to the pole after touching the pole, so that the pole is acted by three forces jointly, and a resultant force of the three forces eventually becomes zero in a stable balance.

In some embodiments, when the driving rotation pulley 340 rotates, the driving rotation pulley 340 can drive the manned pole-climbing work platform to rotate and drive the front driven rotation pulley 331 and the rear driven rotation pulley 332 to rotate.

The motor of the kinetic-energy-impact-type thread-preloader 380 works to drive an upper screw and a lower screw to rotate, that is to drive the reverse-threaded rod 372 and the forward-threaded rod 371 as shown in FIG. 10 to rotate. The upper thrust nut 361 and the lower thrust nut 362 can push the lever to move, so that the front jaw and the rear jaw move inwardly to grip the pole. A feedback signal value of the pressure sensor 390, which is fed back to a PLC input unit, sharply increases after touching the pole. When the feedback signal value reaches a set value (at this time the set value meets the requirements of frictions in the vertical direction), the motor of the kinetic-energy-impact-type thread-preloader 380 stops.

Referring to FIG. 11 and FIG. 12, the kinetic-energy-impact-type thread-preloader includes a rotating-impact hammer 382/382', a planetary reducer 383/383', a motor 384 and a forward-threaded rod 371 and a reverse-threaded rod 372.

A rotating speed of the motor 384 is 4500 revolutions per minute. The motor 384 drives the rotating-impact hammer 382, through the planetary reducer 383 with a rotation speed of 1285 revolutions per minute. The rotating-impact hammer 382 is constituted by a hammer head and a hammer shell. The motor drives the rotating-impact hammer through the planetary reducer to implement a speed change, and the motor, the rotating-impact hammer and the planetary reducer forms a typical impact structure in a kinetic-energy-impact wrench, where the kinetic-energy-impact wrench has merely one impact head and can't meet requirements of providing impacts at both ends. The rotating-impact hammers 382 and 382' are symmetrically disposed on two ends of an output shaft of the motor, and the planetary reducers 383 and 383' are symmetrically disposed on the two ends of the output shaft of the motor.

When the screw 371/372 is has no resistance, the screw 371/372 rotates synchronously with the rotating-impact hammer, and the screw 371/372 and the rotating-impact hammer have the same rotating speed. When the screw 371/372 has resistance, the hammer head escapes from the hammer shell, and the hammer head impacts the hammer shell made of steel with a high speed in a rotating direction of the output shaft. The hammer head impacts the hammer shell with a frequency of 2570 times per minute, so that a relatively high torsion moment is acted at the screw momentarily.

A value of the torsion moment is relative to a mass of a hammer body and a rotating speed of the output shaft of the reducer, as shown in the following kinetic energy formula: $E=1/2\ mv^2$, where m is the mass of a hammer body, and v is a linear speed of the hammer body relative to a center of rotation of the hammer body.

In the disclosure, the kinetic-energy-impact-type thread-preloader may be designed to have a no-load speed of 2570 revolutions per minute, a momentary impact output torsion moment of 230 Nm and an impact frequency of 0 to 2570 times per minute. The motor of the kinetic-energy-impact-type thread-preloader has a power of 180 W and a weight of 1.1 kilograms. According to the theoretical thrust formula of a screw $F=2\pi\eta T/L$, a theoretical thrust of a screw $F=2\pi\eta T/L=2\times3.14\times0.75\times230/0.003=361100$ N, where $\eta$ is a transmission efficiency of the screw and equals to 75%, T is the torsion moment and equals to 230 Nm, and L is a lead of the screw and equals to 3 millimeters, so that a transmission screw can be selected to be self-locked by frictions.

The manned pole-climbing work platform is provided power by the main unit. In a rigid connected body of the four limbs and the bodies, each of the four limbs is rotatable about the longitudinal axis of the outer side of one of the bodies. Each of the distal pole-gripping mechanical hands of the four limbs grips the pole. The left body and the right body moves in the vertical direction by turns, so that climbing up and climbing down are implemented. Meanwhile, the double sprocket is driven by the motor to implement climbing up and climbing down. In addition, a stop button and an emergency stop button are provided for the process of climbing up and climbing down.

The pole-gripping mechanism grips the pole through the front jaw and the rear jaw such that the front jaw and the rear jaw close relative to each other. The pole-gripping mechanism can tightly grip a pole within a certain range of diameters. In the case of a pole with a special measurement, a corresponding end gripping tool may be replaced. In addition, the front jaw and the rear jaw are driven by the kinetic-energy-impact-type thread-preloader to move, so that sufficient pole-gripping force can be achieved.

The present disclosure has the following advantages over the related art:

1. In the manned pole-climbing work platform, the up-holding chain, the down-holding chain and the double sprocket driven by the main unit are provided, so that climbing of the left body and the right body by turns and climbing up of the main unit are implemented, so that an operator is freed from dangerous and harsh labor environments and heavy labors.

2. Automatic climbing up and human-assisted crossing an obstacle are implemented, so that an obstacle with a certain volume can be crossed.

3. Distance warnings for an obstacle and a high voltage are implemented, and an automatic forced stop is applied when a warning threshold is exceeded.

4. While a battery provides power, the quantity of the power is displayed. Alarms happen when the power is week. The pole-gripping mechanism can be locked to the pole after an undesired power-off. Replacing battery on the pole is implemented.

What is claimed is:

1. A pole-gripping mechanism applicable to a manned pole-climbing work platform, the pole-gripping mechanism comprising an arm and a distal pole-gripping mechanical hand, wherein:
the distal pole-gripping mechanical hand comprises a front jaw, a rear jaw, a front pivot, a rear pivot and a pole-gripping driver assembly;
the pole-gripping driver assembly comprises a front thrust-nut composite pivot, a rear thrust-nut composite pivot, a forward-threaded rod, a reverse-threaded rod and a preloader;
the front jaw and the arm are articulated with each other through the front pivot, and the rear jaw and the arm are articulated with each other through the rear pivot;
the preloader comprises a motor, planetary reducers and rotating-impact hammers, wherein the planetary reducers are symmetrically disposed on two ends of an output shaft of the motor, and the rotating-impact hammers are symmetrically disposed on the two ends of the output shaft of the motor;
the preloader is configured to drive the forward-threaded rod and the reverse-threaded rod to rotate synchronously, the forward-threaded rod and the front jaw are articulated with each other through the front thrust-nut composite pivot, and the reverse-threaded rod and the rear jaw are articulated with each other through the rear thrust-nut composite pivot; and
the front jaw and the rear jaw are openable or closeable relative to each other to release or grip a pole.

2. The pole-gripping mechanism as claimed in claim 1, further comprising a front driven rotation pulley, a rear driven rotation pulley and a driving rotation pulley, wherein the driving rotation pulley is disposed on the arm and located between the front jaw and the rear jaw, the front driven rotation pulley is disposed on an inner side of an opening of the front jaw, the rear driven rotation pulley is disposed on an inner side of an opening of the rear jaw, and the driving rotation pulley, the front driven rotation pulley and the rear driven rotation pulley are configured to grip the pole jointly so that the pole-gripping mechanism is rotatable in a circumferential direction of the pole.

3. The pole-gripping mechanism as claimed in claim 1, further comprising a pressure sensor, wherein the pressure sensor is configured to detect a pressure value of the front jaw and the rear jaw after the front jaw and the rear jaw are in touch with the pole, wherein when the pressure value reaches a set value, a motor of the preloader stops.

4. A manned pole-climbing work platform, comprising a main unit, a left body, a right body, a lifting actuator, and pole-gripping mechanisms located on the left body and the right body,
wherein the lifting actuator comprises a double sprocket driven by the main unit, an up-holding chain, a down-holding chain, a left slide rail securely connected to the left body, a right slide rail securely connected to the right body, and slide carriages cooperating with the left slide rail and the right slide rail respectively;
wherein the up-holding chain and the down-holding chain are engaged with the double sprocket, two ends of the up-holding chain are connected to an upper end of the left body and an upper end of the right body respectively, two ends of the down-holding chain are connected to a lower end of the left body and a lower end of the right body respectively, the double sprocket is freely rotatably supported by the slide carriages, and the main unit is configured to drive the double sprocket to rotate;
wherein one of the left body or the right body is configured to grip the pole through the pole-gripping mechanisms, the other of the left body or the right body is driven by the lifting actuator to move upwardly, and the left body and the right body move by turns so that the main unit climbs upwardly; and
wherein each of the pole-gripping mechanisms is the pole-gripping mechanism as claimed in claim 1.

5. The manned pole-climbing work platform as claimed in claim 4, further comprising pole-embracing mechanisms, wherein each of the pole-embracing mechanisms is configured to drive a respective one of the pole-gripping mechanisms to rotate.

6. The manned pole-climbing work platform as claimed in claim 5, wherein two of the pole-gripping mechanisms are disposed on the left body sequentially in an up-down direction, and the each of the pole-embracing mechanisms comprises a hollow-shaft geared motor, an upper transmission shaft, a lower transmission shaft, bearings and an anti-torsion beam, wherein the upper transmission shaft, the lower transmission shaft are rigidly connected to the hollow-shaft geared motor, the upper transmission shaft and the lower transmission shaft are secured to the a bearing located on an upper tip inside the left body and a bearing located on a lower tip inside the left body respectively, and the anti-torsion beam is configured to secure the hollow-shaft geared motor,
wherein an arm of one of the pole-gripping mechanisms at an upper position of the left body is securely connected to the upper transmission shaft, and an arm of the other one of the pole-gripping mechanisms at a lower position of the left body is securely connected to the lower transmission shaft.

7. The manned pole-climbing work platform as claimed in claim 4, wherein the left slide rail comprises a front left slide rail and a rear left slide rail; the right slide rail comprises a front right slide rail cooperating with the front left slide rail and a rear right slide rail cooperating with the rear right slide rail; the slide carriages comprise front slide blocks cooperating with the front left slide rail and the front right slide rail respectively and rear slide blocks cooperating with the rear left slide rail and the rear right slide rail respectively.

8. The manned pole-climbing work platform as claimed in claim 7, wherein the left slide rail extends over a whole height of the left body, the right slide rail extends over a whole height of the right body, and a height of each of the front slide blocks or a height of each of the rear slide blocks is one-half to one-third of the whole height of the left body.

9. The manned pole-climbing work platform as claimed in claim 4, wherein a cross section of an outer side wall of the left body and a cross section of an outer side wall of the right body are both V-shaped.

10. The manned pole-climbing work platform as claimed in claim 4, further comprising a left safety thrust roller and a right safety thrust roller, wherein the main unit is located at a front of the left body and the right body, the left safety thrust roller and the right safety thrust roller are connected to the main unit, the left safety thrust roller rotates around and cooperates with an outer side wall of the left body, and the right safety thrust roller rotates around and cooperates with an outer side wall of the right body.

11. The manned pole-climbing work platform as claimed in claim 4, further comprising a seat and a control handle.

12. The manned pole-climbing work platform as claimed in claim 4, wherein the pole-gripping mechanism further comprises a front driven rotation pulley, a rear driven rotation pulley and a driving rotation pulley, wherein the driving rotation pulley is disposed on the arm and located between the front jaw and the rear jaw, the front driven rotation pulley is disposed on an inner side of an opening of the front jaw, the rear driven rotation pulley is disposed on an inner side of an opening of the rear jaw, and the driving rotation pulley, the front driven rotation pulley and the rear driven rotation pulley are configured to grip the pole jointly so that the pole-gripping mechanism is rotatable in a circumferential direction of the pole.

13. The manned pole-climbing work platform as claimed in claim 12, further comprising pole-embracing mechanisms, wherein each of the pole-embracing mechanisms is configured to drive a respective one of the pole-gripping mechanisms to rotate.

14. The manned pole-climbing work platform as claimed in claim 13, wherein two of the pole-gripping mechanisms are disposed on the left body sequentially in an up-down direction, and the each of the pole-embracing mechanisms comprises a hollow-shaft geared motor, an upper transmission shaft, a lower transmission shaft, bearings and an anti-torsion beam, wherein the upper transmission shaft, the lower transmission shaft are rigidly connected to the hollow-shaft geared motor, the upper transmission shaft and the lower transmission shaft are secured to the a bearing located on an upper tip inside the left body and a bearing located on a lower tip inside the left body respectively, and the anti-torsion beam is configured to secure the hollow-shaft geared motor, wherein an arm of one of the pole-gripping mechanisms at an upper position of the left body is securely connected to the upper transmission shaft, and an arm of the other one of the pole-gripping mechanisms at a lower position of the left body is securely connected to the lower transmission shaft.

15. The manned pole-climbing work platform as claimed in claim 12, wherein the left slide rail comprises a front left slide rail and a rear left slide rail; the right slide rail comprises a front right slide rail cooperating with the front left slide rail and a rear right slide rail cooperating with the rear right slide rail; the slide carriages comprise front slide blocks cooperating with the front left slide rail and the front right slide rail respectively and rear slide blocks cooperating with the rear left slide rail and the rear right slide rail respectively.

16. The manned pole-climbing work platform as claimed in claim 15, wherein the left slide rail extends over a whole height of the left body, the right slide rail extends over a whole height of the right body, and a height of each of the front slide blocks or a height of each of the rear slide blocks is one-half to one-third of the whole height of the left body.

17. The manned pole-climbing work platform as claimed in claim 12, wherein a cross section of an outer side wall of the left body and a cross section of an outer side wall of the right body are both V-shaped.

18. The manned pole-climbing work platform as claimed in claim 4, wherein the pole-gripping mechanism further comprises a pressure sensor, wherein the pressure sensor is configured to detect a pressure value of the front jaw and the rear jaw after the front jaw and the rear jaw are in touch with the pole, wherein when the pressure value reaches a set value, a motor of the preloader stops.

* * * * *